United States Patent [19]

Granryd

[11] Patent Number: 4,508,150
[45] Date of Patent: Apr. 2, 1985

[54] RETRACTABLE TRACTION INTENSIFYING MEANS FOR AGRICULTURAL TRACTORS AND THE LIKE

[75] Inventor: Thorvald G. Granryd, Lake Forest, Ill.

[73] Assignee: TG Strips, Inc., Lake Forest, Ill.

[21] Appl. No.: 567,625

[22] Filed: Jan. 3, 1984

[51] Int. Cl.³ .............. B60C 27/20; B60C 27/10; B60C 27/08
[52] U.S. Cl. .................. 152/169; 81/15.8; 152/179; 152/182; 152/185.1; 152/213 A; 152/217; 152/225 R; 152/228
[58] Field of Search ........... 152/208, 213 R, 213 A, 152/217, 218, 219, 225 R, 225 C, 226–228, 209 B, 169, 170, 179, 180, 182, 185, 185.1, 187; 81/15.8

[56] References Cited

U.S. PATENT DOCUMENTS

| | | | |
|---|---|---|---|
| 2,501,973 | 3/1950 | Seymour | 152/228 |
| 2,553,712 | 5/1951 | Jensen | 152/228 |
| 4,018,258 | 4/1977 | Neal | 152/208 |
| 4,402,357 | 9/1983 | Granryd | 152/218 X |

*Primary Examiner*—William A. Powell
*Assistant Examiner*—Thomas Bokan
*Attorney, Agent, or Firm*—August E. Roehrig, Jr.

[57] ABSTRACT

A lightweight device for obtaining improved traction efficiency of rubber tired vehicles without adding ballast weight. The device has high-strength, thin-gauged traction intensifying means secured to a driving tire, providing higher drawbar pull at higher rate of travel speed by utilizing stronger sub-surface soil and extended tire life; and includes actuating means, for engaging and disengaging the traction enhancing means for convenient conversion to allow travel on pavement.

13 Claims, 11 Drawing Figures

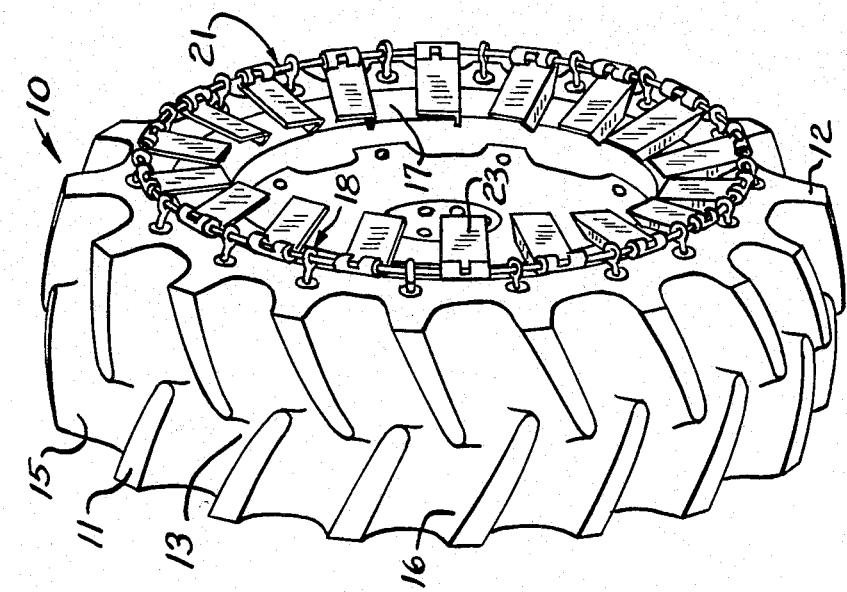
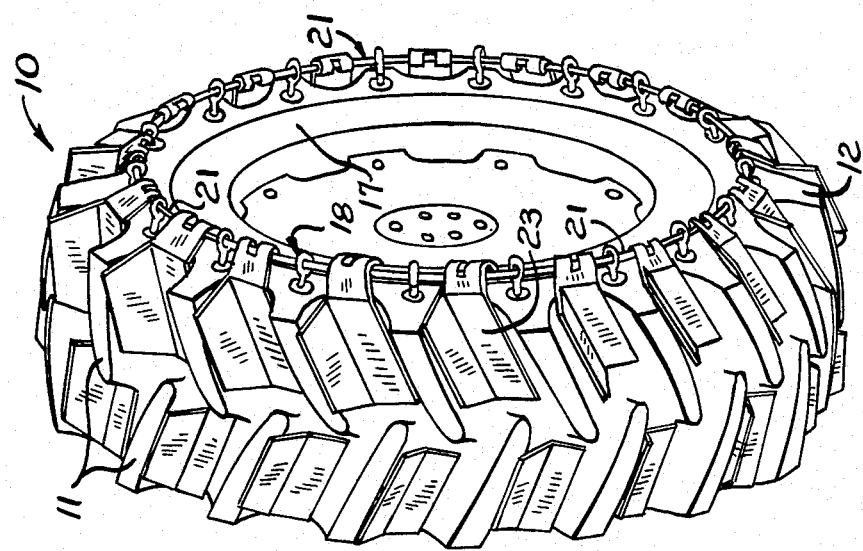
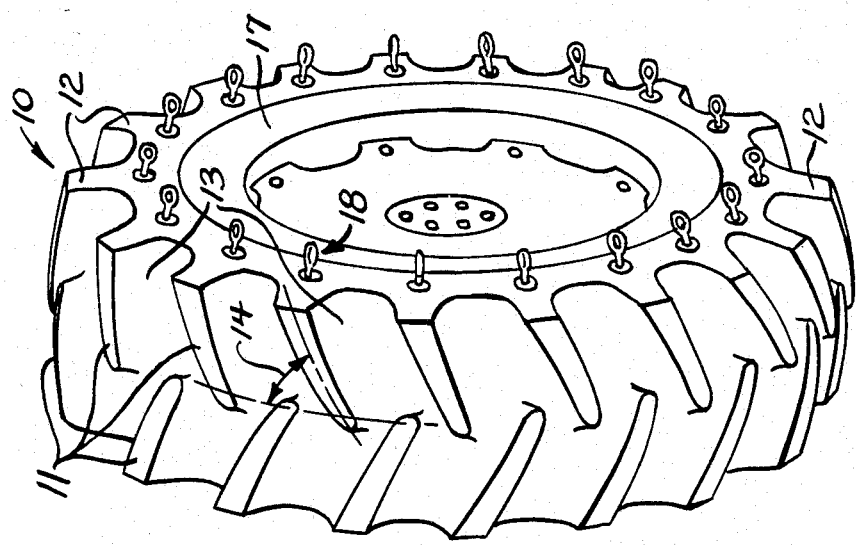

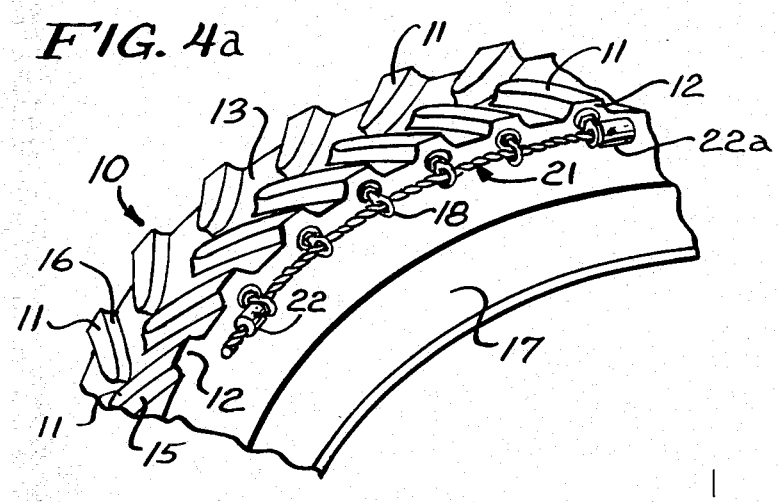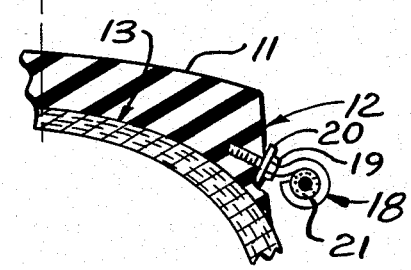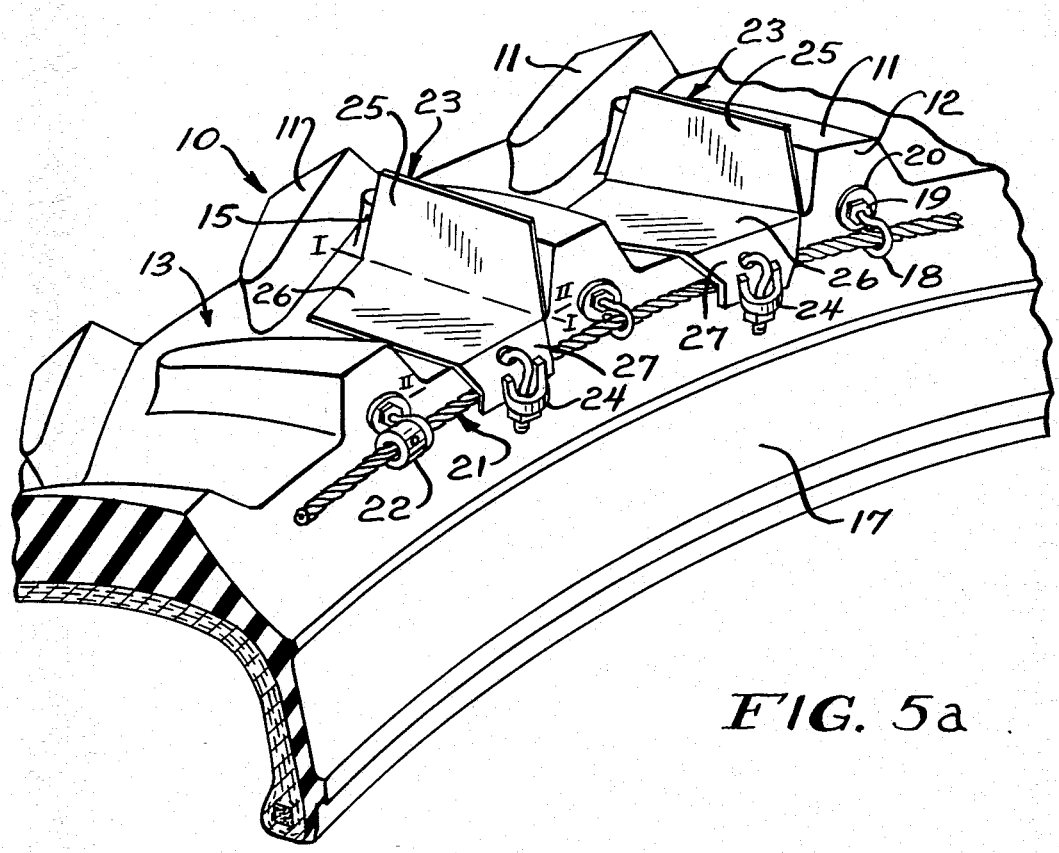

RETRACTABLE TRACTION INTENSIFYING MEANS FOR AGRICULTURAL TRACTORS AND THE LIKE

BACKGROUND TO THE INVENTION

This invention relates generally to an apparatus and method for improving traction efficiency of agricultural wheeled tractors and reference is made to U.S. Pat. No. 4,402,357 the disclosure of which is incorporated herein by reference. The invention disclosed in this patent includes a method by which the traction intensifying means are engaged and retracted for obtaining added utility.

In the above referenced patent, shortcomings of the pneumatic agricultural tires are described and analyzed. Some further observations are as follows.

To efficiently convert horsepower into usuable drawbar pull is a primary object of agricultural drawbar tractors. In this respect, the weakest, most inefficient link in that chain is the tire itself, or more specifically, the tire-soil interface. In *Handbook of Agricultural Tyre Performance* (Dwyer, et al, 1976, National Institute of Agricultural Engineering, Silsoe, England) test results are shown for tires ranging in size from 12.4-36 through 18.4-38 operating on five types of fields. Per these tests, the maximum "terra-dynamic" efficiency averages 65%; varying from 55% on wet, loose earth to 75% on dry grassland. By contrast, mechanical efficiency of a tractors powertrain is typically about 94%. Thus, if its engine delivers 106 horsepower to the flywheel, 100 hp is available to its drive wheels; but, on the average, only 65 hp are available at the drawbar for the implement; and a modest 55 hp if the ground consists of wet, loose earth. Further shown are the drawbar pulls obtained in the same tests and given at 20% rate of tire slippage and at tire loads, which include a 20% add-on weight, as permitted by manufacturers at travel speeds below 20 km per hour (12 miles per hour). Per these tests, the drawbar pull averages 50% of tire load.

The deviation in tire efficiency of plus and minus ten percentage points reflects the multitude of soil conditions encountered. This necessitates compromise in tire design; it is noteworthy that a leading tire manufacturer recommends no less than seven types of tires to cover five applications of usage.

While tire manufacturers are offering a great number of tire configurations, the tractor design has undergone a series of evolutions in the last half a century; now seemingly entering its fourth phase for optimum drawbar performance first: adding ballast to two-wheel drives (still prevails);

second: making bigger two-wheel drives;

third: making large, articulated type four-wheel drives;

fourth: furnishing so called Factory Installed Front Power Assist Option;

The latter achieves improved traction by diverting power, originally intended for driving rear wheels only, also to the steering wheels. This option is not only expensive, adding some 20% to tractor price, but the improvement in drawbar pull is nominal; averaging 17% according to the english book *Agricultural Tyres* (Inns & Kilgour, 1978, Dunlop Ltd., London, England). Nevertheless, its demand in the U.S. is said to be growing at a 30% annual rate. (Truck & Off-Highway Magazine, June/1983).

Early tractors achieved their high traction efficiency from utilizing the higher soil values of sub-surface layer, as elaborated upon in the above referenced patent. The superiority of this approach to obtain drawbar pull is quantified from comparative tests, published in a swedish paper, entitled *Tendencies in Tractor Development, Bigger Tractors—Higher Drawbar Pull—Four-Wheel-Drives* (Nordstrom, 1966, Statens Maskinprovningar, Ultuna, Sweden). Here, the coefficient of drawbar pull in sugar-beet fields of different conditions were measured for various drive wheel combinations and arrangements. In one series of tests, steel wheels of early tractors were compared with tires, both tested on same two-wheel drive tractor. Per these tests, the coeff. of DBP (coefficient of drawbar pull)

at 15% slippage: steel wheels/tires=0.86/0.22; (3.9);

at 20% slippage: steel wheels/tires=0.90/0.29; (3.1);

at 30% slippage: steel wheels/tires=0.95/0.36; (2.6);

Above tests were made on wet beet field and, in regard to the tests performed at 20% slippage, the paper states, in part: " . . . The coeff. of drawbar pull, and thus the drawbar pull at same tractor weight, is—at 20% slippage—over three times as high with the steel wheels. At change-over to steel wheels on the same tractor, its weight becomes, however, considerably less if no ballast is added to the steel wheels. With the tractor used in the tests, the weight with steel wheels was only about 70% of the weight with tires. Nevertheless, the drawbar pull was more than twice as high with steel wheels." To assess the significance of the difference in coeff. of DBP in above test series additional data are required; these are given in Table I below. To compute the corresponding differences in productivity and hourly cost savings, say that: the load from the implement is such so as to require 20% slippage when tractor is equipped with tires; further, in both configurations, the tractor is operating so as the speedometer reads five miles per hour.

TABLE I

| Two-Wheel Drive Tractor operating on wet sugar-beet field, and equipped with | | |
|---|---|---|
| | Tires Size: 14-34 | Steel Wheels Type: Skeleton |
| Coeff. of DBP at slippage rate | | |
| 30% | 0.36 | 0.95 |
| 25% | 0.33 | 0.93 |
| 20% | 0.29 | 0.90 |
| 15% | 0.22 | 0.86 |
| 10% | 0.14 | 0.80 |
| 5% | N.G.* | 0.67 |
| 2½% | N.G. | 0.40 |
| 2% | N.G. | 0.25 |
| Weight w/o driver, | | |
| Tot. Tractor, kg | 4420 | 2900 |
| On Drive Wheels, kg | 3170 | 1870 |
| % of Total | 75% | 65% |

*N.G. = Not Given in test report

Analysis: When tractor is equipped with tires and slippage rate is 20% it means the prevailing coeff. of DBP is 0.29; and, as the weight on drive tires is 3170 kg, the drawbar pull exerted by the tractor is $0.29 \times 3170 = 919$ kgf. At a speedometer reading of 5 miles per hour and the slippage rate is 20%, the actual travel speed is $5 \times (1-0.20) = 4.00$ mph. To exert same drawbar pull of 919 kgf when tractor is equipped with steel wheels, its coeff. of DBP must be $919/1870 = 0.49$. Extrapolating from Table above, the required slippage rate is 3%. At a speedometer reading of 5 miles per hour and the slippage rate is 3%, the actual travel speed is $5 \times (1-0.03) = 4.85$ mph. Thus, by change-over to steel wheels, the travel speed has been increased by 21% (4.85/4.00−1), even though the tractor's weight was reduced from 4220 kg to 2900 kg, or by 31% (4220−2900=1320; 1320/4222=0.31). Say, further, that hourly operating cost is 30 dollars; at five "speedometermiles" per hour, the cost per mile is 6 dollars. For each ten hours of operation, the tractor moves 40 miles when equipped with tires while this distance becomes 48.5 miles if equipped with steel wheels. Thus, not only is the productivity of the tractor here improved by 21% but 51 dollars ($8,5 \times 6=51$) is saved in operating costs for every ten-hour shift. And this, because the steel wheels are capable of utilizing the ground more efficiently, even though their weight upon it is 1300 kg less than with tires, (3170−1870=1300).

The above set of circumstances are well known in the art, but reviewed here to illuminate the high potential for productivity increase, energy and cost savings, which the concept of steel wheels offer. On the other hand, the tire offers an all together overriding advantage of on-pavement travel. From this, it becomes apparent that a combination of both concepts will provide a useful solution. The present invention embodies such an arrangement and employs a simple mechanism, by which the advantages of tires as well as of steel wheels are utilized and offering an expeditous conversion from one concept to another and vice versa.

SUMMARY OF THE INVENTION

It is therefore an object of the invention to improve traction efficiency for rubber tired vehicles.

It is another object to enable a rubber tired vehicle to function with equal traction efficiency as a tractor equipped with steel wheels.

It is a further object to enable the traction enhancing means to be readily engaged and disengaged while remaining on the tire.

Yet a further object is to readily interchange one traction enhancing means with another in an assortment of configurations and aggressiveness to suit different tire sizes and designs as well as various field conditions.

It is another object of the invention to reduce tire wear, to obtain extended useful tire life.

DESCRIPTION OF THE DRAWINGS

Further objects of the invention, together with additional features contributing thereto and advantages accruing therefrom, will be apparent from the following description of the preferred embodiments of the invention, which are known in the accompanying drawings with like reference numerals indicating corresponding parts throughout, wherein:

FIG. 1 shows a typical agricultural tire, with anchor rings secured to shoulder of tire lugs.

FIG. 2 shows same tire, with traction enhancing means in engaged position.

FIG. 3 shows same tire, with traction enhancing means in disengaged position.

FIGS. 4a and 4b show arrangement for securing one battery of traction enhancing means.

FIGS. 5a and 5b are partial view of one battery of traction enhancing means in its engaged and disengaged position, respectively.

DESCRIPTION OF THE PREFERRED EMBODIMENTS

Figure 5B:
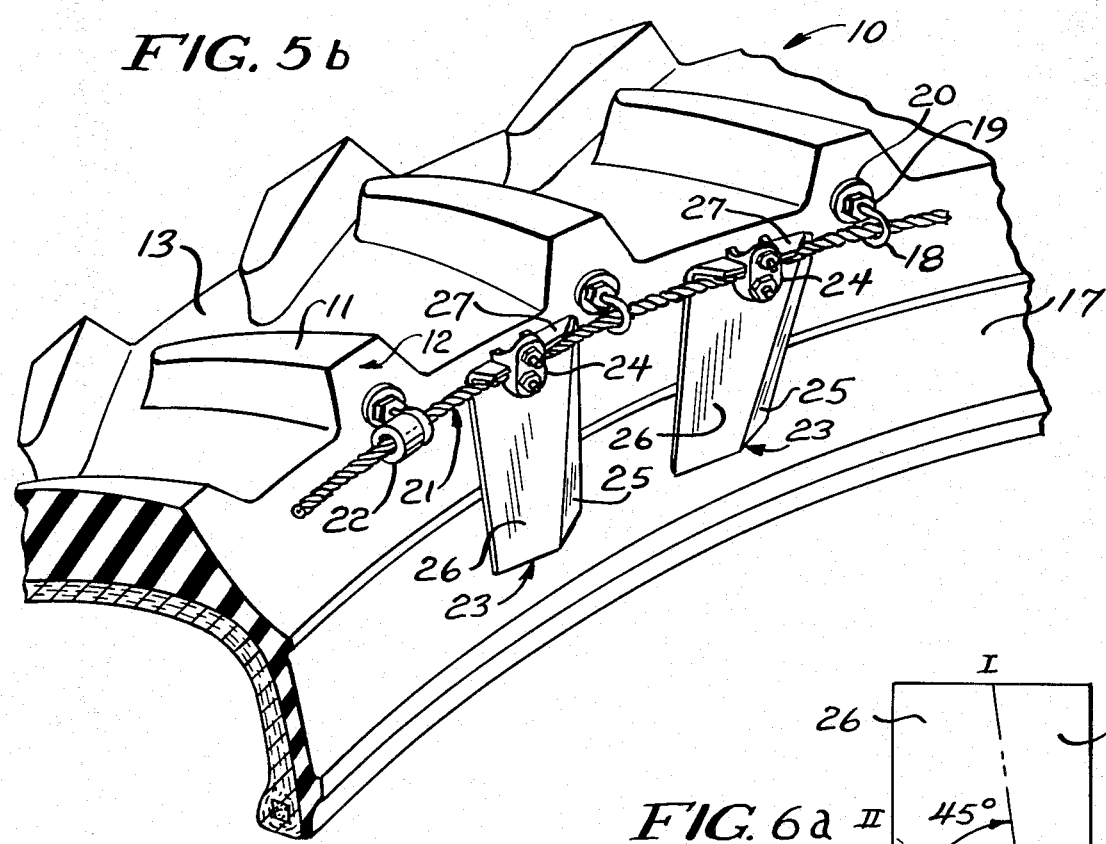

Referring to FIGS. 1, 2 and 3 there is shown a typical agricultural tire, 10; in regard to its tread design, having tire lugs 11, each with shoulder 12, and under-tread face 13. Lugs 11 are formed at a lug angle 14 with the center line of tire, and each with a leading lug side 15 and a trailing lug side 16.

In FIG. 1 there is also shown an anchor ring 18, secured on a center line at lower portion of each shoulder 12. As best shown in FIG. 4b, anchor ring 18 consists of a regular eye screw, threaded into a hole, drilled into shoulder 12 at such place and direction so as to cause no damage to either lug 11 or under-tread face 13. Ring 18 is backed up with flat washer 20 and locked in position with nut 19.

FIG. 2 shows same tire 10, with spades 23 in their engaged position upon under-tread face 13 and against leading lug side 15 of each tire lug 11. FIG. 3 shows tire 10 with spades 23 in disengaged, or retracted, position against side wall, 17, of tire. In both positions, spades 23 are held firmly, as will be discussed.

In FIG. 4a is shown a piece of regular steel wire rope, 21, having been slipped through anchor rings 18 and secured longitudinally with a shorter lock ring 22 and a longer lock ring 22a, each having a set screw, not numerated. Length of wire rope 21 is such that three or four alike will cover entire circumference of tire 10. As shown in FIGS. 1, 2 and 3, it contains eighteen tire lugs; others may have more or fewer, depending upon tread type, lug angle or size. FIG. 4a shows that wire rope 21 extends along six tire lugs; thus, here three pieces are required for tire 10. Also to be noted is that the one end of rope 21 which is adjacent to the shorter lock ring 22 extends beyond its corresponding leading lug side; this extension is received in and held in position by the protruding end of the longer lock ring 22a of the adjacent piece of wire rope 21. It is further to be noted that, although each of the three pieces of rope 21 are securely afixed lengthwise, they slip-fit inside anchor rings 18, so as to allow rotation.

FIGS. 5a and 5b show a portion of wire rope 21, to which traction enhancing means, spades 23, are secured. So equipped in full will form one battery of six spades, referring to FIG. 4a; three such batteries will comprise the traction enhancing means for tire 10. Spades 23 are secured to rope 21 by means of a regular wire rope coupling, 24, comprising a U-bolt, a wedge-base and two hexagon nuts, none of these components numerated on the drawings.

Figure 6A:
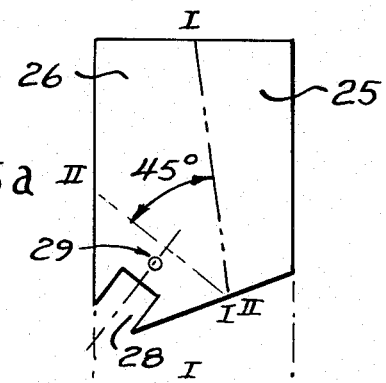
FIGS. 6a, 6b and 6c are top view of steel stampings, from which are formed traction enhancing means to fit different tire lug angles.
Figure 6B:
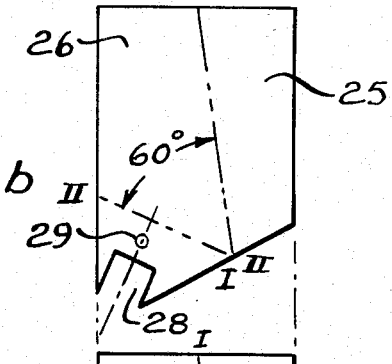
Figure 6C:
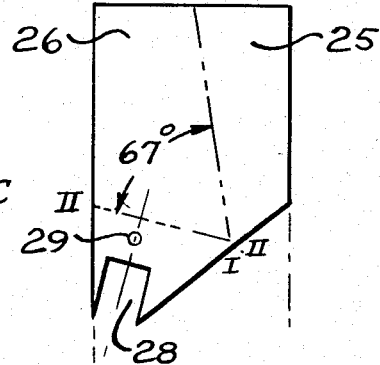

Referring further to FIGS. 5a and 5b as well as to FIGS. 6a, 6b and 6c, spade 23 is formed from high strength, thin gauged sheet steel having spring steel characteristics. A preferred material is MartInsite, type M190, manufactured by Inland Steel Company; alternate materials are hardened, high carbon spring steel, such as AISI 1074, or hardened, medium carbon boron steel, such as are used in agricultural cultivators. Further, spade 23 is made from stampings, slit into suitable widths for various configurations and aggressivness desired for different field applications. Also, an assortment of spade configurations are needed to fit the various lug angles of tires on the market. FIGS. 6a, 6b and 6c show stampings for three different lug angles and made from same width of steel strip and with gate, 28, and hole, 29, to conform with wedge-base and U-bolt of coupling 24, for securing to rope 21. As indicated by the angles 45, 60 and 67 degrees, each stamping fits lug angle, 14, of 45, 30 and 23 degrees, respectively. Lines I—I and II—II in FIG. 6 indicate where bends are made to form spade 23. As best shown in FIG. 5a, the bend along line I—I makes the spade 23 to essentially conform with tire lug 11, forming a steel lug, 25, and a sole, 26. In operation, steel lug 25 receives support from leading lug side 15 in resisting tractive and lateral forces and sole 26 receives support from under-tread face 13 in resisting vertical and penetrating loads. As best shown also in FIG. 5a, the bend along line II—II of the spade 23 forms a base portion 27 which makes the spade 23 to reach around wire rope 21 and to be securely fastened with coupling 24, thus providing a fulcrum for rotating.

A rotative action is required to achieve the important object to readily convert the tractor from "tire-drive" to "steel wheel-drive," and vice versa, and preferably that a full battery of spades 23 must be activated in a single and quick maneuver. This is accomplished by means of regular wire rope. As normally employed in various types of lifting hoists, etc., high tensile steel wire rope is wound on drums and passed over sheaves at operating radii in order of five to seven times its diameter. This is made feasible from the build-up of wires into strands and strands wound into rope. If preformed to conform with radius of curvature as defined by the six anchor rings 18 and slipped into place as shown in FIG. 4a, wire rope 21 can be rotated around its longitudinal axis with only slight resistance, and so due to construction. Thus, with spades 23 securely fastened to wire rope 21, six spades are simultaneously put into engaged or disengaged position. It has been found, however, that, for satisfactory operation. spades 23 should press firmly against under-tread face 13 while engaged and, likewise, should press firmly against side wall 17 while disengaged. Such pre-load of spade 23 is accomplished by pre-stressing wire-rope 21 before installation. This is done by simply pre-forming it to take a radius of curvature smaller than that defined by the series of anchor rings 18. Amount of pre-load depends upon amount of pre-stress; for higher pre-load, wire rope 21 is pre-formed into a smaller radius of curvature.

Procedure for installing spades 23 is as follows:

With pre-stressed wire rope 21 secured as shown in FIG. 4a, the first of spades 23 is positioned upon under-tread face 13 with its steel lug 25 snugly toughing the leading lug side 15 and coupling 24 loosely in place, wire rope 21 is being gripped by suitable tool, such as pipe wrench, and then turned outwardly, or clock-wise as viewed in the drawings, after which the hexagon nuts of coupling 24 are tightened. Upon releasing the wrench, spade 23 will now be pressing against the under-tread face 13 of tire 10, as wire rope 21 will tend to regain its prior angular position. Turning spade 23 toward its disengaged position it will be found that spade 23, after reaching an upright position, will snap into side wall 17 of tire, as the wire rope 21 passes over center in its about 220 degree turn. With the first spade 23 returned to its engaged position, the remaining spades of the battery are positioned likewise and secured to wire rope 21 likewise, without further use of the gripping tool.

Figure 7:
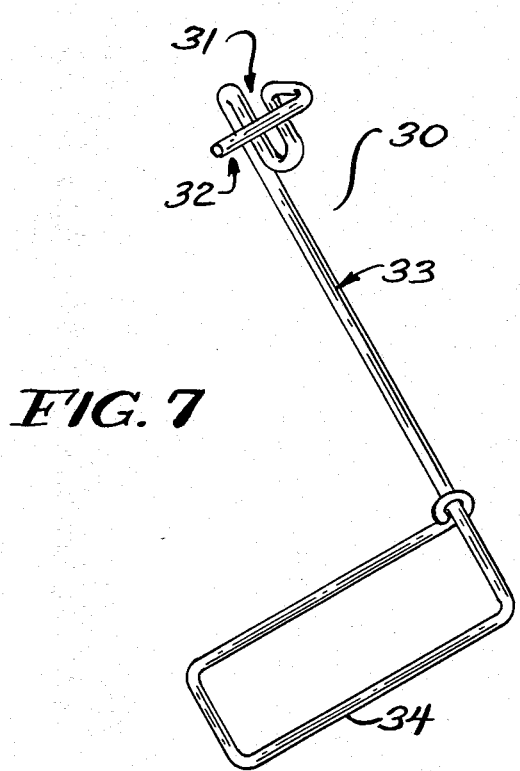
FIG. 7 is a view of hand tool, provided for engaging and disengaging one battery of traction enhancing means.

For effortless and expeditious conversion from "tire-drive" to "steel wheel-drive", a simple hand held tool as shown in FIG. 7 may be used. Tool 30, made from 3/16 inch diameter steel wire and approximately 18 inches long, has a handle 34, a straight leg 33, a "U" opening 31 and a transverse leg 32. Held as shown, and with opening 31 engaging wire rope 21, tool 30 is placed adjacently to one of spades 23. For disengaging, the tool 30 is turned outwardly, or clock-wise as per drawings; with wire rope 21 acting as fulcrum, transverse leg 32 will encounter sole 26 of spade 23, thus lifting it over-center, after which the battery of spades will snap onto wall 17 and remain firmly against it. For engaging spades 23, same procedure, except tool 30 is then turned in counter-clock wise direction; and now the straight leg 33 will encounter sole 26, again lifting it over-center but in opposite direction, after which the battery of spades will snaps into under-tread face 13 and then remain firmly against it.

While the described arrangement and method for conversion from one mode of operation to the other is hereby accomplished in matter of seconds for each battery of spades, it will be apparent that, in the process, the tractor will have to be moved a quarter or so wheel revolutions, as the spades go through a more than 180 degrees of turn and each battery spans one fourth or so of the tire circumference. Nevertheless, the entire process is completed in matter of few minutes. And, it should further be noted, that, regardless of spade configuration, fender design and tire clearance relative to the side of the fender, it is altogether feasible to have spades also on the inner side of tire, as the entire rearward portion of tractor provides the angular clearance needed.

Although spades on both sides of tire 10 will provide for maximum amount of traction enhancing, it should be observed that such arrangement is not a necessity. In many field conditions, the optimum traction efficiency is achieved by installing spades on only the outer side of tire 10. This is so, because the more of traction intensification provided, the greater becomes the motion resistance. It thus is desirable, and an object, to provide an assortment of spade configurations, not only to suit various tire designs, but here for purpose of providing for most economical mode of tractor performance. In this regard, this object is attained, firstly by providing low-cost, lightweight spades, being stampings of high-strength, thin-gauged steel and, secondly, by providing an easy and quick method for exchange, with use of an ordinary wire rope coupling.

In respect to tire wear, and need for tire replacement in present state of the art, quite understandably, the tire lugs are most vulnerable and worn out lugs is consequently the main reason why tires are being discarded and then generally become scrapped. With spades 23 engaged, the function of tire lugs 11 is essentially that of merely providing tractive support for the steel lugs 25. And, as the soles 26 simultaneously protect the under-tread faces 13, it can be seen that virtually all of normal tire wear, will be that, which results from driving on paved roads.

It should be further noted that the above concept of arrangement is not confined to usage on agricultural tires. With certain modifications, it may also supply to construction equipment tires and to all-terrain vehicle tires; and by vulcanizing the anchor rings 18 onto side walls of passenger car tires, the concept may be applied to cars as well.

Further, while the invention has been described in detail with referred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best modes contemplated for carrying out this invention, but the invention will include all embodiments falling within the scope of the appended claims.

What is claimed is:

1. Traction intensifying means for a rubber tired vehicle having a power driven tire, including side walls, under-tread faces and tire lugs, each of the tire lugs having a lug height, a lug length, a leading lug side, a lug angle and a shoulder, said traction intensifying means comprising
    a series of ground engaging spades for mounting on such a tire in a position to be movable between ground engaging and ground avoiding contact, each of said ground engaging spades having a lug portion, a sole portion, a base portion and a spade angle related to the lug angle of the tire,
    a series of anchor means, each one of said series being secured to a shoulder of a tire lug of the tire,
    at least two lengths of wire rope, each one of said lengths being mounted upon said series of anchor means for rotational movement relative thereto, and
    coupling means for fixedly securing said base portion of each of said ground engaging spades onto said lengths of wire rope, such that rotational movement of said wire ropes will move said ground engaging spades between said ground engaging and ground avoiding contact.

2. The traction intensifying means of claim 1, wherein said lug portion of each of said ground engaging spades is formed to conform with the leading lug side of the tire lugs of the tire, and
    said sole portion of each of said ground engaging spades is formed to conform with the under-tread face of the tire.

3. The traction intensifying means of claim 1, wherein said lengths of wire rope are pre-formed in a pre-stressed configuration, thereby being angularly resistant to rotational movement when said lengths are rotatably moved upon said series of anchor means.

4. The traction intensifying means of claim 1, wherein said sole portion of each of said ground engaging spades exerts a force against the under-tread face of the tire upon said lengths of pre-stressed wire rope being rotatably moved in one direction to a ground engaging position, and
    said lug portion of each of said ground engaging spades exerts a force against the side wall of the tire upon said lengths of pre-stressed wire rope being rotatably moved in the opposite direction into a ground avoiding position.

5. The traction intensifying means of claim 1, wherein said lug portion of each of said ground engaging spades have a lug portion height and a lug portion length, said lug portion height exceeding the lug height of the tire lugs, and the lug length of the tire lugs exceeding said lug portion length of said ground engaging spades.

6. The traction intensifying means of claim 1, said spade angle of each of said ground engaging spades coincides with the lug angle of the tire lugs of the tire.

7. The traction intensifying means of claim 1, wherein each of said series of anchor means further includes a threaded shank portion, and wherein each of the shoulders of the tire lugs have means for securing each of said series of anchor means to each of the tire lug shoulders.

8. The traction intensifying means of claim 1, wherein each of said lengths of wire rope have a shorter locking means at a first end thereof and a longer locking means at a second end thereof for longitudinally securing each of said lengths of wire rope to the other.

9. The traction intensifying means of claim 1, wherein said coupling means includes U-shaped fasteners and, wherein said base portion of each of said ground engaging spades includes two openings coinciding with said U-shaped fasteners for securing said base portion of said ground engaging spades onto said lengths of wire rope.

10. The traction intensifying means of claim 9, wherein said ground engaging spades are formed from high-strength thin-gauged steel.

11. The traction intensifying means of claim 10, wherein said ground engaging spades are formed from two or more sheets of high-strength, thin-gauged steel.

12. The traction intensifying means of claim 1 further including tool means operatively connectable with said traction intensifying means for rotating said series of ground engaging spades relative to said anchor means, and
    said series of ground engaging spades comprise at least two batteries of spades mutually exclusively spaces secured to said two lengths of wire rope, and
    each of said at least two batteries of spades spaces having a ground engaging position and a ground avoiding position such that rotational movement of said tool means rotates each of said at least two batteries of spades between said ground engaging position and said ground avoiding position.

13. The traction intensifying means of claim 12 wherein said tool means comprises
    a U-shaped portion having a first curved portion and a second curved portion for operatively engaging said length of pre-stressed wire rope,
    a transverse leg extending from said first curved portion of said U-shaped portion for engaging a portion of one of said ground engaging spades,
    a longitudinal portion having a first end and a second end, said first end extending from said second curved portion of said U-shaped portion, and
    a handle extending from said second end of said longitudinal portion.

* * * * *